Figure 1:
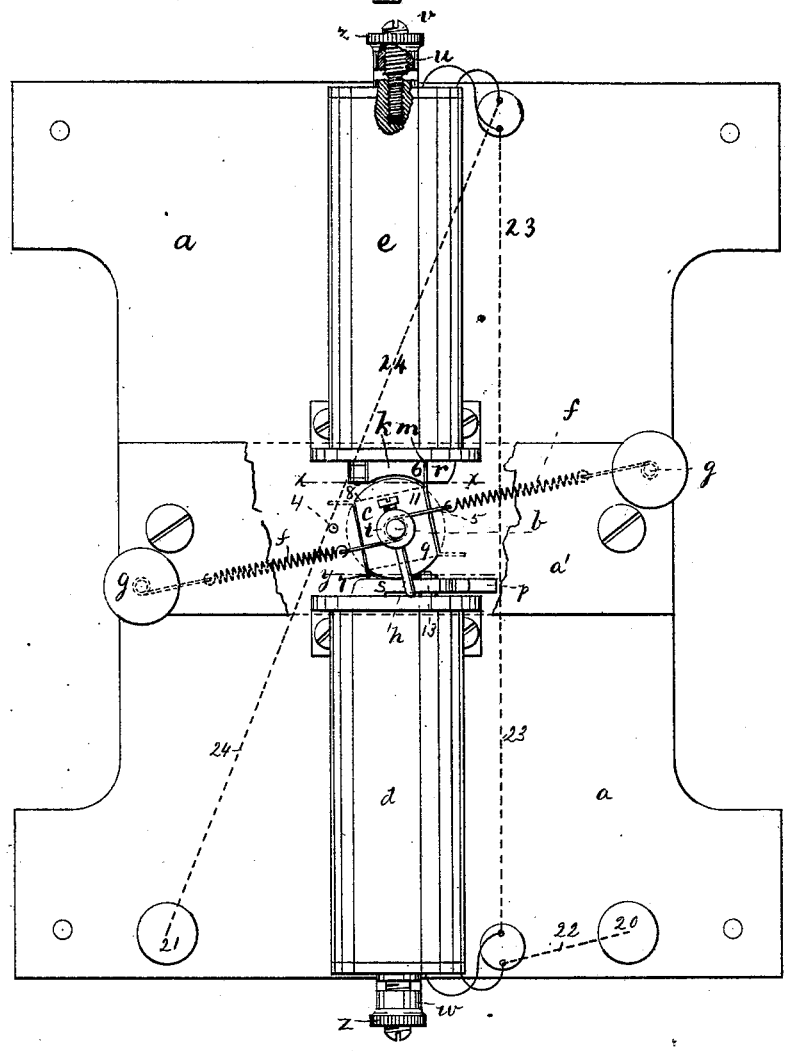

(No Model.)  2 Sheets—Sheet 1.

I. FISHER.
Electrical Railway Signal.

No. 235,145. Patented Dec. 7, 1880.

Witnesses.
Jos. P. Livermore
L. F. Connor

Inventor
Israel Fisher
by Crosby & Gregory, Attys.

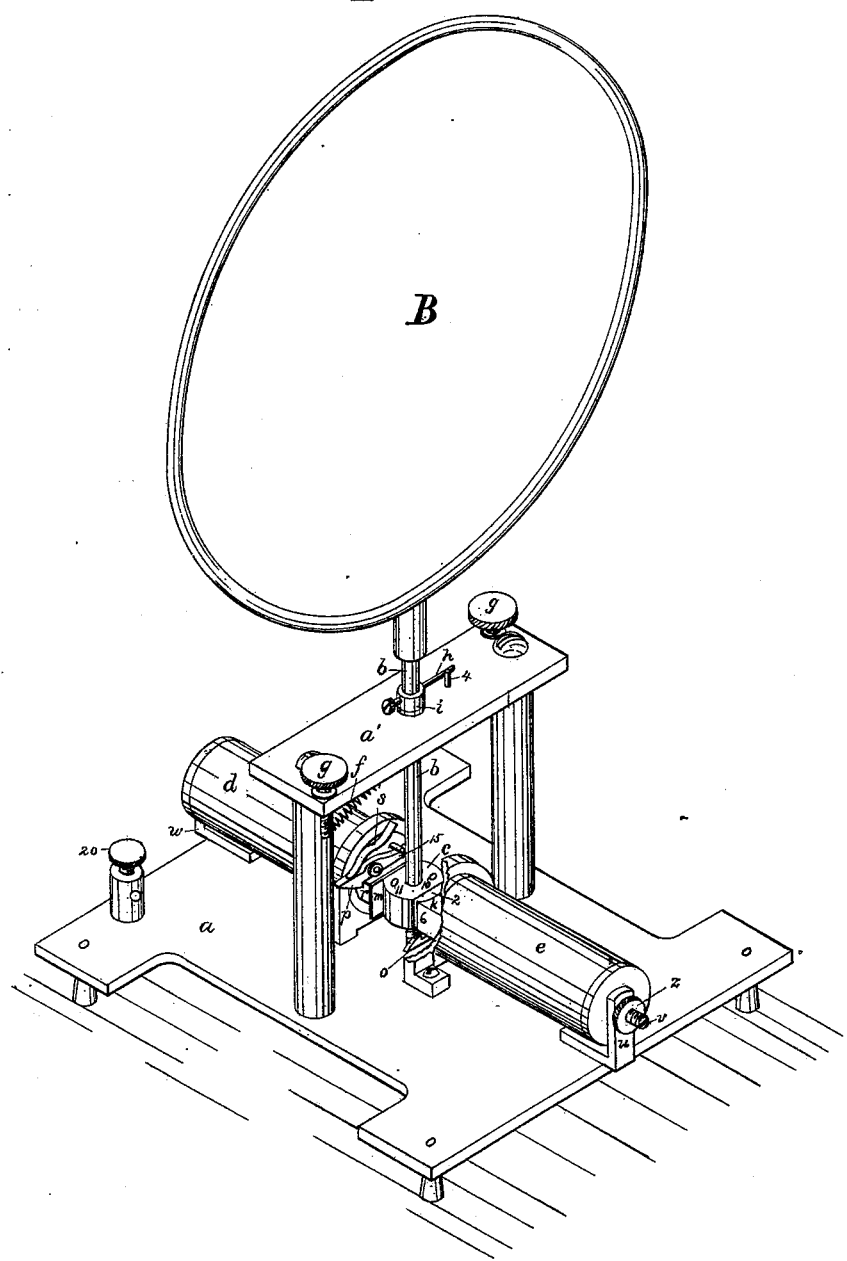

UNITED STATES PATENT OFFICE.

ISRAEL FISHER, OF BOSTON, MASSACHUSETTS, ASSIGNOR TO THE UNION ELECTRIC SIGNAL COMPANY.

ELECTRICAL RAILWAY-SIGNAL.

SPECIFICATION forming part of Letters Patent No. 235,145, dated December 7, 1880.

Application filed March 27, 1880. (No model.)

*To all whom it may concern:*

Be it known that I, ISRAEL FISHER, of Boston, county of Suffolk, State of Massachusetts, have invented an Improvement in Electric Railway-Signals, of which the following description, in connection with the accompanying drawings, is a specification.

My invention relates to an electric signal for railways, and has for its object to produce a signal which may be readily actuated by an electro-magnet of small power.

The signals heretofore in use actuated by electro-magnets have commonly been disks pivoted to rotate on an axis perpendicular to their plane to bring different signals around the edge of the disk into view; or a whole disk has been bodily moved on a pivoted arm into and out of sight. In either case electro-magnets have been used, the armatures whereof have been moved up to and away from the poles in a direction substantially parallel to the axes of the cores, or sometimes the armatures have been drawn into the coils of the magnet by axial magnetism, and in either case a system of levers has been necessary to give an increased length of movement to the signal-arm or a crank-pin moving the said signal.

I employ an apparatus in which an armature is placed directly on the shaft carrying the signal-disk, which is shown as rotating a quarter-revolution on an axis in its plane to display its face for one and its edge for another signal, the mass of the said armature being so disposed between the poles of a magnet that when magnetized the said magnet will cause the armature and its connected shaft to rotate and turn the signal, which may be turned back by a suitable retracting-spring when the electro-magnet is demagnetized.

The electro-magnet is shown as consisting of two sets of coils wound on cores placed in line with one another, their poles, with the armature between, being opposite to one another, and the opposite ends of the said cores being attached to the metal frame-plate, which thus performs the function of a back-strap, such arrangement, together with the winding of the coils, rendering the magnet equivalent to an ordinary horseshoe electro-magnet.
The invention consists partly in the combination of the electro-magnet and its armature, adapted to rotate between the poles thereof, with a pawl to engage and hold the said armature in position when the electro-magnet is demagnetized, the said pawl being withdrawn by the attraction of the magnet when vitalized to allow the signal to be rotated; and also in the combination of the magnet and its armature with a pawl held by the magnet when vitalized in position to engage and hold the armature when rotated by the magnet, the said pawl falling away when the magnet is demagnetized to allow the signal to be rotated back by its retracting-spring.

The invention also consists in certain wings and stops used in connection with the rotary armature and the magnet, and in certain details of construction by which the operation of the apparatus is rendered more certain.

Figure 2:
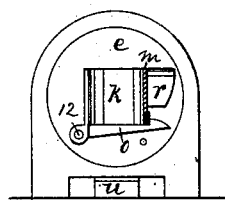
Figure 3:
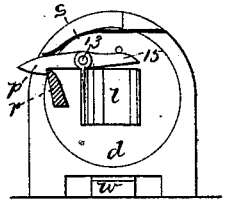
Figure 4:
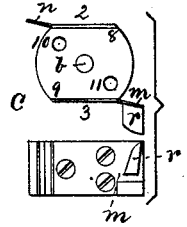

Figure 1 is a plan view of a signal embodying my invention, part of the frame-work being broken away; Figs. 2 and 3, sectional details on the lines $x\ x$ and $y\ y$, respectively, of Fig. 1, showing the signal-holding pawls; Fig. 4, a top and side view of the armature detached; and Fig. 5, a perspective view of the whole apparatus, a part of the magnet being broken away.

The frame-plate $a$, of iron, is provided with suitable posts, supporting at their top a cross-bar, $a'$, provided with a bearing for the signal-shaft $b$, supported at its lower end in a step on the frame-plate $a$, and adapted to have a signal-banner, B, secured to its upper end. The said signal-shaft carries fast upon it an armature, $c$, of considerable width and thickness and curved at its ends, being in shape a portion of a right cylinder with its opposite sides cut off at 2 3, Fig. 4, and having the same axis as the signal-shaft, to enable it to rotate freely between the poles of an electro-magnet, $d\ e$, the ends of which are also limited by a cylindrical surface having the same axis as, but a slightly greater radius than, the one limiting the ends of the said armature.

It will be seen that when the armature is placed with its curved ends adjacent to the poles of the magnet, as shown in full lines, Fig. 1, its mass is nearer to the said poles than when the cut-off or truncated sides are adjacent to the said poles, so that when the electro-magnet is vitalized by an electric current the armature will, by the laws of attraction, be drawn into the former position.

Retracting-springs $f$, attached at one end to the usual spindles, $g$, and at their other ends to cords 5, wound around the signal-shaft, cause the said shaft to rotate back when no longer attracted by the electro-magnet, as will be clearly understood from the drawings, the shaft being stopped, when rotated in this direction, by a pin, 4, in the frame cross-bar $a'$ engaging a stop-arm, $h$, in a sleeve, $i$, secured to the signal-shaft by a set-screw, so as to be adjustable in angular position on the said shaft.

If when the magnet is demagnetized the armature should extend across in such direction that its truncated sides should be exactly at right angles to the cores of the magnet, and if the poles of the said magnet were symmetrically shaped with relation to a plane at right angles to its cores, the tendency of the magnet when again magnetized to rotate the armature in one direction would exactly balance its tendency to rotate it in the other, and theoretically the armature would not rotate at all unless the balance should be disturbed, in which case the rotation would be completed in the direction in which it was started by the disturbing force. In order to guard against this balance and to insure that the armature shall be rotated in the direction to wind the cord 5 against the stress of the springs, each pole of the magnet may be extended a trifle more to one side of a vertical plane through the axis of the signal-shaft parallel with the cores of the magnet than on the other side, such extension of one pole being on one side of the said plane, and that of the other pole being on the other side, as at 6 and 7, such an arrangement insuring that the resultant attractive force of one pole shall be on one side, and that of the other pole on the other side, of the axis of the signal-shaft. For example, referring to Fig. 1, the attraction of the coil $e$ is on the right, and that of the coil $d$ on the left, of the said axis.

In order to further insure the same result, or to attain it in case the poles are so arranged that their resultant attraction is through the axis of the signal-shaft, the stop-arm $h$ is so adjusted in angular position that when it is held against the pin 4 by the stress of the springs $f$ the corners 8 9 of the armature diagonally opposite to one another are much nearer the poles of the magnet than the other corners, as shown in dotted line, Fig. 1, thus making the attractive power much greater than at the corners 10 11, and insuring that the rotation shall be properly started in the direction to stretch the spring $f$. The same effect may be caused or increased by removing a portion of the metal on the sides to be least attracted, as shown at the corners 10 11, Fig. 4.

Two wings, $m\ n$, of sheet-iron, attached to the sides of the armature, project beyond its ends at the corners 10 11, diagonally opposite one another, and serve to help complete the rotation of the armature toward the end of its movement, the said wings being then attracted to the side of the poles of the magnet, which additional attraction, together with the momentum of the parts in rotating, carries the armature, as shown in full lines, Fig. 1, slightly beyond the position with its truncated faces parallel to the cores of the magnet, where it is caught and held by the holding device or pawl $o$, of soft iron, pivoted at 12 in a piece of brass or other non-magnetic material on the wing $m$ of the armature. The pawl holds the armature and insures that the magnet shall not oscillate under variations in the attractive force of the magnet, and renders a careful adjustment of the springs $f$ unnecessary. As soon as the magnet is demagnetized the pawl $o$ drops by its own weight, and the armature and signal-shaft, being no longer held thereby, nor by the attraction of the magnet, are rotated back by the springs $f$ until the arm $h$ strikes the pin 4 and stops the signal-shaft.

The wings $m\ n$ are faced with brass or other non-magnetic material on the side which comes against the poles of the magnet.

When desired, a second pawl, $p$, similarly pivoted at 13 on a bearing on the other pole of the magnet, may be employed to engage a projection, $r$, on the wing $m$ of the armature, and hold the signal in the position last described, the said pawl being pressed down to engage the projection $r$ by the spring $s$, and serving to keep the signal from fluctuating under the influence of slight currents, not sufficient in acting on the end 15 of the said pawl to overcome the spring $s$; but when a current of the proper force passes through the coils of the magnet the end 15 of the pawl is attracted, raising the said pawl from engagement with the projection $r$, and the armature and signal are rotated, as described. The pawls $o\ p$ also serve to prevent any rebound when the signal has completed its movement in either direction.

The cores of the magnet $d\ e$ are attached to iron brackets $u\ w$, themselves connected with the iron frame-plate $a$, such construction, when the coils are properly wound, making a single magnet of the two helices $d\ e$, instead of two independent straight magnets, the poles $k\ l$ being its extreme poles.

The position of the magnet-cores may be adjusted very finely by the differential adjusting-screw $v$, engaging the core of the magnet with a thread of one, and that of the brackets $u\ w$ with a thread of another, pitch. When properly adjusted it is held by the set-nut $z$.

The circuit-wires are attached at the binding-screws 20 21, insulated from the plate $a$, the one 20 being connected, by wire 22, with the coils $d$, the other end of which is connected, by wire 24, with the other binding-screw, 21.

As herein shown, the machine is suitable to be used with a signal operated by an electric current that passes through the coils of the magnet while the signal is to be in one position, and is diverted from the said magnet when the signal is to be in the other position; but it is obvious that by slight modifications the signal might be used in those systems wherein the signal is set in one position by a current of short duration, and then remain so until released or set back by another current of short duration. In such a modification the pawl o might be replaced by one which would engage and hold the armature in its full-line position, Fig. 1, after the magnet is demagnetized, and be released by another current and an independent electro-magnet, if necessary.

It is also evident that the form of the electro-magnet and the shape of the poles thereof and armature may be varied without departing from my invention, which consists in adapting an armature to be rotated through about a quadrant by the attraction of its magnet instead of moving it up to the poles in substantially the direction of the axes of the cores of the magnet, in the usual manner.

If desired, the signal-disk might be rotated on a horizontal axis perpendicular to its plane, the said disk bearing differently-colored sectors or circles about its axis.

The difficulty usually encountered in deriving mechanical movement from magnetic power arises from the fact that the attractive force diminishes as the square of the distance of an armature from the poles of its magnet, so that the armature cannot be drawn up from a great distance. In practice this distance is usually but a very small fraction of an inch, and when the armature is carried on, or is itself an arm carried on a pivoted shaft, the angular movement of the said shaft as the armature is moved to its magnet is almost inappreciable, and, as before stated, it has usually been necessary to employ intermediate mechanism, such as levers and gears, in order to increase the movement sufficiently to produce any useful effect, such intermediate mechanism necessarily forming what may be termed a "dead load," the moving of which consumes a considerable portion of the power of the magnet.

It will be seen that the present invention entirely obviates this difficulty, affording a large angular movement, (about a right angle,) while the attractive force never has to act at any considerable distance. In other words, the effect produced is as if that part of the metal of the armature forming the curved portion of its ends were swung around bodily from its position at the side of and nearly midway between the poles of the magnet to its position adjacent thereto, while the attractive force in accomplishing this acts almost from the first only over the space between the outer curved surface of the armature end and the inwardly-curved surface of the ends of the poles, such space being only sufficient to avoid actual contact.

I am aware that a cylindrical armature pivoted to turn between pole-pieces of ordinary construction is old, and I hereby disclaim any such construction; but I am not aware of such an armature connected directly with a signal-shaft to rotate a signal-disk thereon.

I claim—

1. In an electric signal apparatus, an electro-magnet and its armature connected with a shaft to be rotated by the attractive power of the said magnet, the main body of the said armature being adapted in rotating to approach without coming in contact with the poles of the magnet, and being provided with wings at its sides, one wing extended beyond one and the other beyond the other end of the said armature, to be brought up to the poles of the magnet in the rotation of the said armature, substantially as described.

2. In an electric railway-signal apparatus, a signal and shaft therefor, and an armature attached to said shaft and adapted to be rotated by the attraction of an electro-magnet, combined with a holding device controlled by the same electro-magnet, to engage and hold the said armature after it has been rotated by its electro-magnet, and then to be disengaged from the said armature upon the demagnetization of the said electro-magnet, substantially as described.

3. In an electric signal apparatus, a signal-shaft and armature attached thereto adapted to be rotated between the poles of an electro-magnet in one direction by the attraction of the said magnet, and in the other direction by a mechanical retracting-power, combined with a holding device controlled by the same electro-magnet, to engage and hold the armature when the magnet is demagnetized, and to be disengaged therefrom by the said magnet when magnetized to release the armature and allow it to be rotated by the attraction of the said magnet, substantially as and for the purpose described.

4. The signal-shaft and an armature carried thereby adapted to be rotated by an electro-magnet in one direction and by a mechanical retractor in the other, combined with a fixed stop and a stopping-arm adjustably connected with the said shaft, to cause the armature to stop in proper angular position to be rotated in the desired direction by the electro-magnet, substantially as described.

5. An electro-magnet and its armature pivoted between the poles thereof to rotate on an axis at right angles to a line joining the said poles, the said armature being otherwise symmetrical in shape with relation to its axis, but having a portion of its metal removed at the corners diagonally opposite one another, substantially as and for the purpose described.

In testimony whereof I have signed my name to this specification in the presence of two subscribing witnesses.

ISRAEL FISHER.

Witnesses:
Jos. P. LIVERMORE,
N. E. C. WHITNEY.